United States Patent
Herrmann-Buerk et al.

(10) Patent No.: US 11,452,306 B2
(45) Date of Patent: Sep. 27, 2022

(54) METHOD FOR PRODUCING A PREFERABLY VEGAN FOOD PRODUCT PARTICULATE, PREFERABLY VEGAN FOOD PRODUCT PARTICULATE, AND PREFERABLY VEGAN FINAL FOOD PRODUCT

(71) Applicant: HOCHLAND SE, Heimenkirch/Allgäu (DE)

(72) Inventors: Dirk Michael Herrmann-Buerk, Amtzell (DE); Marie-Luise Mahler, Lindenberg (DE)

(73) Assignee: HOCHLAND SE, Heimenkirch/Allgäu (DE)

( * ) Notice: Subject to any disclaimer, the term of this patent is extended or adjusted under 35 U.S.C. 154(b) by 334 days.

(21) Appl. No.: 16/553,730

(22) Filed: Aug. 28, 2019

(65) Prior Publication Data
US 2020/0100529 A1   Apr. 2, 2020

(30) Foreign Application Priority Data
Sep. 6, 2018  (EP) .................................. 18192920

(51) Int. Cl.
A23C 11/06 (2006.01)
A23L 19/00 (2016.01)
A23C 20/00 (2006.01)
A23L 2/38 (2021.01)

(52) U.S. Cl.
CPC .............. *A23L 19/01* (2016.08); *A23C 11/06* (2013.01); *A23C 20/005* (2013.01); *A23L 2/382* (2013.01); *A23V 2002/00* (2013.01)

(58) Field of Classification Search
CPC .......... A23V 2002/00; A23V 2250/548; A23C 11/103; A23C 11/06; A23C 11/10; A23C 20/005; A23C 20/02; A23C 9/1315; A23C 20/025; A23C 11/106; A23C 20/00; A23C 3/02; A23L 2/382; A23L 19/01; B02C 19/0043; B02C 19/00
See application file for complete search history.

(56) References Cited

U.S. PATENT DOCUMENTS

| | | | |
|---|---|---|---|
| 5,656,321 A * | 8/1997 | Berger ................. | A23C 11/103 426/598 |
| 2011/0064862 A1* | 3/2011 | McCready ........... | A23C 9/1238 426/598 |

FOREIGN PATENT DOCUMENTS

| | | |
|---|---|---|
| EP | 1292196 A2 | 3/2003 |
| EP | 2926670 A1 | 10/2015 |
| RU | 2564837 C1 | 10/2015 |
| WO | 0197629 A2 | 12/2001 |
| WO | 2017050480 A1 | 3/2017 |
| WO | 2018122021 A1 | 7/2018 |

OTHER PUBLICATIONS

DataYourEat, Almond Flour, partially deoiled, retrieved online Dec. 1, 2021, published Aug. 28, 2018. https://www.datayoureat.com/r/GqLmDIFxJa4b/Almond_Flour_partially_de-oiled?u=uscs&n=full#nutrition (Year: 2018).*
Swati et al., "Plant-based Milk Alternatives an Emerging Segment of Functional Beverages: a review", Journal of Food Science and Technology, vol. 53, No. 9, Sep. 2016.
"Almond Flour, partially de-oiled" Aug. 27, 2018, data sheet from www.datayoureat.com.
Tetra Pak. "Diary Processing Handbook" Tetra Pak Processing Systems AB, 1995.
Notice of Opposition for patent application No. 18192920.9 Oct. 6, 2021.

* cited by examiner

*Primary Examiner* — Hong T Yoo
(74) *Attorney, Agent, or Firm* — Bachman & LaPointe, P.C.

(57) ABSTRACT

A method for producing a vegan food product particulate (X, Y) based on almond flour, as a recipe component or directly as a final food product, includes:

a) providing partially de-oiled almond flour having between 5 and 20% by weight fat and between 43 and 57% by weight protein, b) providing water, c) producing a liquid mixture of the partially de-oiled almond flour and the water, the percentage by weight of the almond flour being between 1 and 40% by weight and of water being between 60 and 99% by weight, d) heating the liquid mixture to a temperature between 72° C. and 138° C. and obtaining a heated liquid, e) high-pressure homogenizing the heated liquid in a hot high-pressure homogenization step and obtaining a heated hot high-pressure homogenized liquid, f) cooling the heated hot high-pressure homogenized liquid.

17 Claims, 1 Drawing Sheet

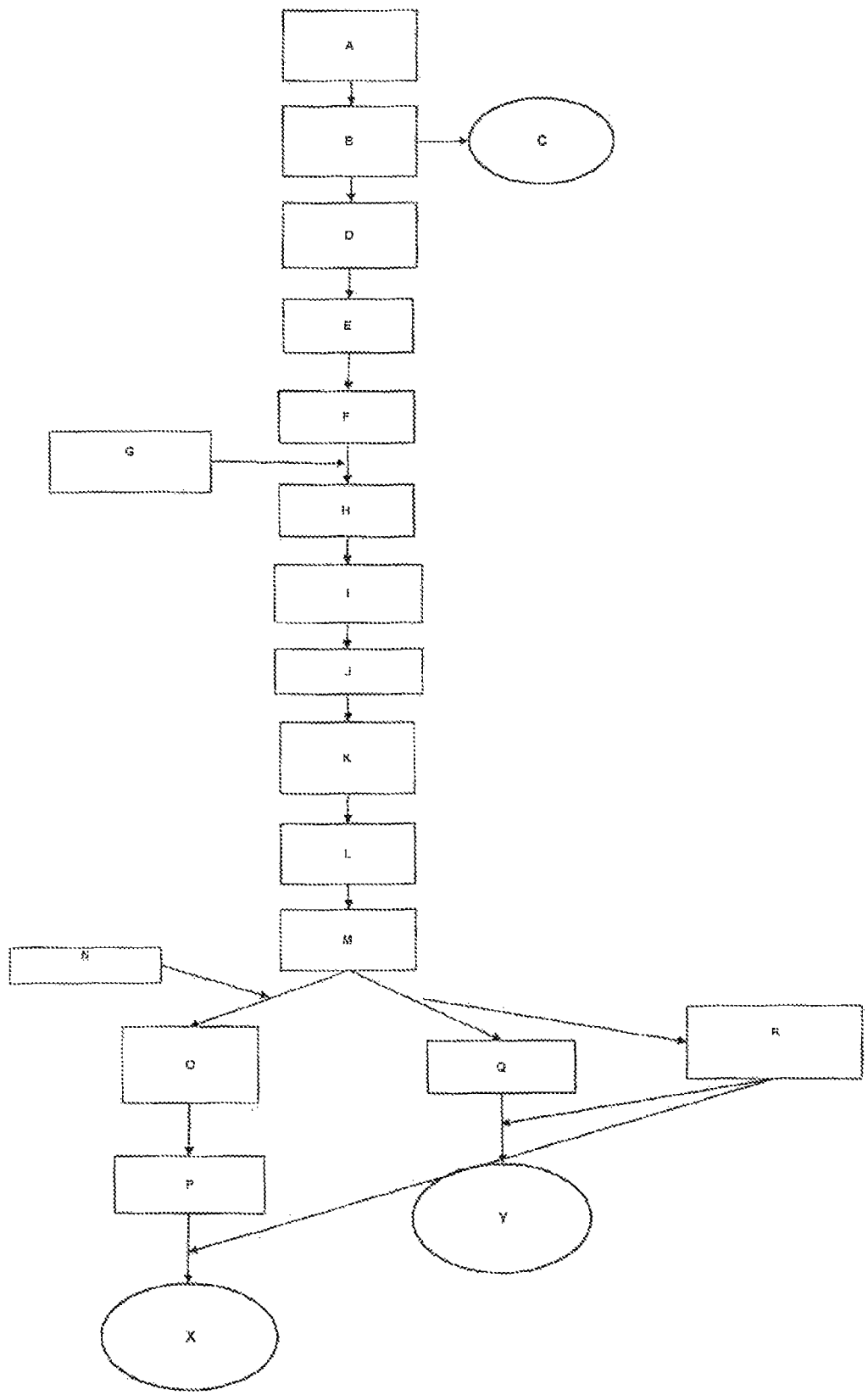

METHOD FOR PRODUCING A PREFERABLY VEGAN FOOD PRODUCT PARTICULATE, PREFERABLY VEGAN FOOD PRODUCT PARTICULATE, AND PREFERABLY VEGAN FINAL FOOD PRODUCT

BACKGROUND OF THE INVENTION

The invention relates to a method for producing a preferably vegan food product particulate based on almond flour and its further processing into a final food product according to a preferred embodiment. The food product particulate resulting from the method according to the invention is preferably used as a recipe component for producing final food products, in particular vegan final food products, or directly as a final food product itself.

Furthermore, the invention relates to a preferably vegan food product particulate based on almonds and to an also preferably vegan final food product comprising a proportion of the food product particulate based on almonds according to the invention as a recipe component.

From WO 2017/050480 A1, a method for producing a vegan, cream cheese-like food product based on almonds is known. The known method is based on a processing of a pasty mass consisting of almonds, to which oil or fat is added according to a preferred embodiment, a pumpable mass being obtained by adding water, the pumpable mass being heated and then high-pressure homogenized. The known method leads to excellent vegan food products which are used as a cream-cheese substitute and are directly comparable to milk-based cream cheese with respect to their texture properties. However, the further processing of the known product as a recipe component of derived or alternative final food products is difficult. Specifically, the possible application amount is limited since the mixing with water, in particular, leads to an undesirable emulsification of the oil contained in the product. Furthermore, a disruption of the gel formation with respect to starch-based products due to the incompatibility of native proteins and starch gels can be observed. As a recipe component in derived or alternative final food products, the cream cheese-like food product known from the aforementioned publication would severely limit the addition of other fatty ingredients because of the high initial fat content and, in particular, does not allow the fat content of the final product to be selected within in a wide range, which would be desirable.

From WO 2018/122021 A1, a method for producing a protein beverage is known, the known method comprising the step of heating a liquid mixture of plant material particles and water following a homogenization step.

EP 1 292 196 B2 describes a method for producing a protein beverage using isolated or extracted plant proteins, i.e. pure plant proteins and not complete plant material particles, as an ingredient. In contrast to the proteins used, complete plant material particles or plant flours are already insoluble. Furthermore, the particle size of the proteins used is significantly larger than the size of the flour particles of interest within the scope of the present invention.

SUMMARY OF THE INVENTION

Starting from the aforementioned state of the art, the object of the invention is to indicate an alternative preferably vegan food product particulate based on almonds which is suitable for further processing into preferably vegan alternative final food products (in particular milk substitute products) and which is also characterized by a higher protein content and a reduced oil or fat content—in particular compared to the known cream cheese-like food product. Preferably, the aforementioned disadvantages of the known cream cheese-like product with respect to emulsification when mixed with water and/or a disruption of the gel formation in starch-based products is to be reduced at least, preferably avoided. The food product particulate according to the invention is to be suitable in particular for the use as a recipe component of final food products and not limit the fat content of said final products to a very narrow range from the outset.

Additionally, the object is to indicate such an improved food product particulate either directly as a final food product or as a recipe component for producing final food products, in particular vegan final food products.

Furthermore, the object is to indicate a final food product which is characterized by containing a preferably relatively large amount of the food product particulate according to the invention, which is mixed with water, preferably without disadvantageous emulsification, and/or has not disrupted a gel formation of starch-based products.

Concerning the method, said object is attained by the features disclosed herein using partially de-oiled or partially de-fatted almond flour as a basis for producing the food product particulate, the method being configured in such a manner that a specific partial de-functionalization, denaturing and de-agglomeration of the almond proteins and aggregates contained in the particles is realized, resulting in a dispersion of almond protein/fiber particles with a defined particle size. It is essential that the partially de-oiled almond particles used are not pure protein particles, but (except for the reduced fat content) complete plant particles comprising fibers, carbohydrates and starch, etc. in addition to the proteins. Compared to conventional almond flour, a reduced-fat almond flour, i.e. partially de-oiled almond flour, is used according to the invention.

Specifically, the method according to the invention comprises the step of providing partially de-oiled almond flour which is preferably obtained by means of an oil mill. The partially de-oiled almond flour used has a percentage by weight of fat between 5 and 20% by weight, preferably between 10 and 20% by weight, particularly preferably of at least approximately 15% by weight, and a proportion by weight of protein between 43 and 57% by weight, preferably between 48 and 52% by weight, particularly preferably of at least approximately 50% by weight. Additionally, it is preferred when the almond flour used has a particle size distribution which is characterized by a mean particle diameter (median of the volume distribution) $x_{50,3}$ between 50 μm and 500 μm, preferably between 100 μm and 400 μm, particularly preferably between 100 μm and 300 μm. A mean particle diameter $x_{50,3}$ of at least approximately 150 μm is particularly preferred. All parameters indicated in the present disclosure with respect to particle size distributions or particle diameters were realized in an aqueous solution by means of a partica laser scattering particle size distribution analyzer LA960 of the company Horiba Scientific at a circulation speed 2 and a stirring speed 2, each of the samples having been treated with ultrasound at strength 2 for 1 min prior to the measurement. Furthermore, the almond flour used preferably has a water content between 4 and 9% by weight, preferably of at least approximately 6% by weight. The pH of the almond flour is preferably between 6.2 and 6.8, particularly preferably at 6.5. The percentages by weight of fat or oil indicated in the present disclosure were identified according to the Weibull-Stoldt VDLUFA C 15.2.3 method. The protein contents or proportions indicated in the present disclosure were identified according to the Dumas method.

All following information with respect to fat content, protein content or particle size of the present disclosure is based on the aforementioned analysis methods for determining the fat and protein content and the particle size.

According to a preferred embodiment, the production of the almond flour can be a part of the method according to the invention. For this purpose, almonds are preferably blanched first, followed by the removal of almond oil, preferably in an oil mill, until the aforementioned fat content is achieved. The resulting almond press-cake is ground, the partially de-oiled almond flour used thus being preserved.

An additional method step according to the invention is the providing of water and producing a liquid mixture (also comprising pasty mixtures) of the almond flour and the water, preferably with stirring, the percentage by weight of almond flour in the liquid mixture being selected to be between 1 and 40% by weight, preferably between 2 and 20% by weight, particularly preferably between 8 and 15% by weight very particularly preferably 13% by weight, and the percentage by weight of water being selected to be between 60 and 99% by weight, in a preferred manner between 80 and 98% by weight, preferably between 85 and 92% by weight, particularly preferably at least approximately 87% by weight.

As an essential method step, the method according to the invention comprises at least one, preferably only one, single-stage or multi-stage hot high-pressure homogenization step which is obligatorily carried out in a heated state of the liquid mixture after a heating step of the liquid mixture. Following the hot high-pressure homogenization, preferably immediately, the heated, hot high-pressure homogenized liquid is cooled to a target temperature which depends on how the homogenized liquid is processed further, i.e. whether it is to be fermented or not, as will explained later on. As will also be explained in detail, a cold high-pressure homogenization, which is to be implemented before the heating step and thus before the hot high-pressure homogenization step, can optionally be added to the method according to the invention.

It is essential that the obligatory high-pressure homogenization step is a hot high-pressure homogenization step following the heating step to a temperature of at least 72° C. The almond flour particles agglomerate during the heating step, the hot liquid with the agglomerates being hot high-pressure homogenized and cooled afterwards according to the invention in order to prevent re-agglomeration. It is therefore essential that the obligatory high-pressure homogenization follows the heating step and that the heated liquid mixture is high-pressure homogenized in a heated state, i.e. hot high-pressure homogenized.

The food product particulate obtained after the cooling is a suspension of partially de-oiled almond particles in water, the almond particles, compared to pure protein particles known from the state of the art, being significantly larger in the suspension and insoluble from the beginning. The hot high-pressure homogenized liquid is preferably cooled as quickly as possible, in particular directly after the high-pressure homogenization, in order to avoid re-agglomerations of the almond particles. In particular, the cooling is realized in such a manner, preferably quickly enough, that, after cooling, the hot high-pressure homogenized liquid has a particle size distribution which is characterized by a mean particle diameter $x_{50,3}<36$ µm, preferably between 5 µm and 35 µm, particularly preferably of 15 µm. The particle size distribution is particularly preferably characterized by a particle diameter $x_{10,3}<10$ µm, preferably between 6 µm and 9 µm, particularly preferably between 7 µm and 8 µm, and/or preferably in a particle diameter $x_{90,3}<100$ µm, in particular between 1 µm and 99 µm, preferably between 10 µm and 99 µm, in a preferred manner between 35 µm and 99 µm, more preferably between 36 µm and 80 µm, particularly preferably between 45 µm and 75 µm.

The use of partially de-oiled almond flour according to the invention and its above-described processing lead to a totally innovative preferably vegan food product particulate having excellent features, in particular as a recipe component for producing final food products. The increased protein and reduced fat content of the food product particulate according to the invention (homogenized suspension of partially de-oiled almond particles in water) allows a preferred use of the food product particulate according to the invention as a recipe component for producing final food products having fat content configurable or selectable in a wide range—in particular, the fat content of the final product is not limited or at least significantly less limited by the fat content of the recipe component (food product particulate). It is a protein food product particulate which is directly consumable as a final food product as an alternative to the use as a recipe component, in particular when additional ingredients are added before and/or during the heating step of its production.

If required, in particular in the case, but not limited to it, that the food product particulate according to the invention is to be used directly, i.e. without further processing and/or addition of additional components, as a final food product, it is possible, as described above, to add at least one other ingredient, in particular from the group of ingredients: salts, hydrocolloids, sugar, sugar substitute products, spices, before and/or during the heating step so as to produce the liquid mixture of the heated liquid, the total quantity of all additional ingredients not exceeding a percentage by weight of 10% by weight, in a preferred manner of 5% by weight, more preferably of 3% by weight, even more preferably of 2% by weight, even more preferably of 1% by weight, in the liquid mixture. In a particularly preferred embodiment, the method for producing a food product particulate as a recipe component of another food product or of a final food product dispenses with the addition of any additional ingredients. Regardless of this, it is preferred, in particular with respect to the resulting nutritional deficiencies, to dispense with the use of hydrocolloids within the scope of the production of the food product particulate or in the food product particulate.

Advantageous embodiments of the invention are disclosed in the dependent claims. All combinations of at least two features disclosed in the description, the claims and/or the FIGURES constitute part of the scope of the invention.

In order to avoid repetitions, disclosed features relating to the method are also seen as relating to the device or as features of the food product particulate and/or of the final food product and are thus also claimable therefor, and vice versa.

As already mentioned, a cold high-pressure homogenization step in which the preferably not yet heated liquid mixture is high-pressure homogenized at a lower temperature than in the hot high-pressure homogenization following the heating step can be implemented before the heating step in addition to the obligatory hot high-pressure homogenization. The particle size distribution is particularly preferably characterized by a $x_{50,3}$ particle diameter of less than 36 µm, preferably between 5 µm and 35 µm, particularly preferably of at least approximately 15 μm. It is particularly preferred when the particle size distribution is also characterized by a $x_{10,3}$ particle diameter of <10 μm, preferably between 6 and 9 μm, particularly preferably between 7 and 8 μm. It is additionally or alternatively preferred when the particle size distribution is characterized by a $x_{90,3}$ particle diameter of <100 μm, in particular between 1 μm and 99 μm, preferably between 10 μm and 99 μm, in a preferred manner between 35 and 99 μm, more preferably between 36 and 80 μm, particularly preferably between 45 and 75 μm. The particle diameter $x_{10,3}$ means that 10% of the particles in the volume distribution are smaller than the indicated value. The $x_{90,3}$ particle diameter means that 90% of the particles in the volume distribution are smaller than the indicated value.

The viscosity of the liquid mixture is significantly reduced by means of the facultative, but preferred cold high-pressure homogenization step. This is advantageous because the almond flour particles contained in the liquid mixture tend to swell. By means of the cold high-pressure homogenization and the corresponding reduction of the viscosity, it is possible to further process the liquid mixture and to pump it through the devices used even if the proportion by weight of protein is even higher.

For the cold high-pressure homogenization, any active heating of the previously produced liquid mixture is dispensed with—it is essential that the cold high-pressure homogenization is performed at a temperature preferably significantly below 72° C., in a preferred manner between 4° C. and less than 60° C., particularly preferably between 10° C. and 40° C., even more preferably of at least approximately 22° C. If the liquid mixture is actively heated, this has to be carried out in any event in such a manner that the cold high-pressure homogenization is performed at a temperature from the aforementioned range. Cold high-pressure homogenization will result in a cold high-pressure homogenized liquid mixture, which is then heated and, after a heat-holding time, may be hot high-pressure homogenized in order to be further processed into a first or second food product.

It is particularly preferred when the facultative cold high-pressure homogenization step (and/or the obligatory hot high-pressure homogenization step, which is explained later on) is performed in such a manner that the liquid mass is pumped through a nozzle, such as a slit nozzle in case of high pressures, in particular between 20 bar and 600 bar, particularly preferably between 100 bar and 400 bar, the pressure jet preferably hitting a baffle plate, such as an impact ring. Such a hot-high pressure homogenization can be carried out in one stage, i.e. in such a manner that the entire pressure build-up is realized by means of one nozzle or in one homogenization step, or alternatively in multiple stages, in particular in such a manner that a gradual reduction of an initial pressure, in particular eventually to atmospheric pressure, is realized. As an example, a two-stage high-pressure homogenization device of the company HST-Maschinenbau GmbH, referred to as HL2.5-550K, can be used for the high-pressure homogenization. The hot high-pressure homogenization, which is explained later on, can be realized similarly—at appropriately selected temperatures—, in particular in the aforementioned ranges of pressure between 20 bar and 600 bar, preferably between 100 bar and 400 bar.

It is essential that the facultative cold high-pressure homogenization and, in particular, the obligatory hot high-pressure homogenization, which is explained later on, are performed in such a manner that the respective homogenization result has a particle size distribution as it is repeatedly explained in this disclosure. In this respect, neither the facultative cold high-pressure homogenization step nor the obligatory hot high-pressure homogenization step is limited to the aforementioned device design in which the pressure jet is directed against a baffle plate, such as an impact ring. Alternative high-pressure homogenization devices can also be used for the facultative cold high-pressure homogenization step and/or the obligatory hot high-pressure homogenization step, particularly preferably at pressures which are even higher than the aforementioned values. A sufficient shear force input is essential. As an example, alternatively to a baffle plate homogenization device, it is possible to use devices in which the shear forces necessary for the high-pressure homogenization are introduced into the liquid to be homogenized by pumping the liquid at high pressure, in particular between 100 bar and 3000 bar, preferably between 172 bar and 2068 bar, particularly preferably between 600 bar and 2068 bar or higher, through an interaction chamber including micro channels which accelerate the liquid to be homogenized to high speeds in order to generate high shear rates and forces. Such high-pressure homogenization devices for the cold and/or hot high-pressure homogenization are available on the market under the brand name Microfluidizer of the company Microfluidics International Corporation, Westwood, USA. A device referred to as M110EH, which comprises a reaction chamber type H30Z-G10Z, has shown positive results. In particular when pressures of at least 600 bar and higher are used, it is possible that the particle size distribution of the respective high-pressure homogenization result is characterized by a $x_{90,3}$ particle diameter significantly smaller than 45 μm, particularly between 1 μm and 44 μm, preferably between 10 μm and 44 μm.

It is particularly preferred when the facultative preceding cold high-pressure homogenization step is performed in such a manner, in particular at a pressure of at least 20 bar, preferably between 20 bar and 600 bar or higher, that the resulting first food product particulate has a particle size distribution which is characterized by a mean particle diameter (median of the volume distribution) $x_{50,3}$ smaller than 36 μm, preferably between 5 μm and 35 μm, particularly preferably of at least approximately 15 μm. Furthermore, it is particularly preferred when the particle size distribution is characterized by a $x_{10,3}$ particle diameter of <10 μm, preferably between 6 and 9 μm, more preferably between 7 and 8 μm. It is additionally or alternatively preferred when the particle size distribution is characterized by a $x_{90,3}$ particle diameter of <100 μm, in particular between 1 μm and 99 μm, preferably between 35 and 99 μm, in a preferred manner between 36 and 80 μm, even more preferably between 45 and 75 μm. The cold high-pressure homogenized liquid mixture is particularly preferably characterized by a water content between 75 and 99% by weight, preferably between 80 and 85% by weight. The proportion by weight of fat of the cold high-pressure homogenized liquid mixture is preferably between 0.1 and 6% by weight and is preferably at least approximately at 2.5% by weight. The protein content is preferably between 0.5 and 21% by weight, particularly preferably at least approximately at 6.5% by weight. The pH is preferably between 6.2 and 6.8, particularly preferably, the pH is at least approximately 6.5.

As already mentioned, the liquid mixture can be heated without a previous cold high-pressure homogenization step, or after such a cold high-pressure homogenization step, to a temperature between 72° C. and 138° C., preferably between 72° C. and 99° C., more preferably between 72° C. and 90° C. in order to obtain a heated liquid. As a result, the almond proteins contained in the almond flour particles in addition to other components such as fibers, etc., denature and large rough almond protein agglomerates are formed. In order to obtain a first or second food product particulate at a later stage, a hot high-pressure homogenization step (single-stage or multi-stage) takes place, the hot high-pressure homogenization taking place directly or as soon as possible (<30 s) after reaching the target temperature from the aforementioned temperature range or alternatively after a heat-holding time, the heat-holding time being preferably selected from a range between 30 s and 25 min, preferably between 30 s and 5 min. A combination of the heating temperature and the heat-holding time is preferably selected in such a manner that, at the time of the beginning of the hot high-pressure homogenization, a denaturation enthalpy is <3, preferably <2, more preferably <1 or particularly preferably 0 joule/g protein. An unheated or not yet heated liquid mixture, i.e. the yet unheated almond particle dispersion, generally has a denaturation enthalpy between 14 and 18 joule/g protein measured at 91° C. and a heating rate of 1° C./30 s, the denaturation enthalpy being preferably measured by means of dynamic differential scanning calorimetry. The hot high-pressure homogenization is characterized in that it is realized in a (yet) heated state, in particular at a temperature between 50° C. and 138° C., more preferably between 50° C. and 120° C., even more preferably between 60° C. and 105° C., even more preferably between 70° C. and 95° C., particularly preferably between 72° C. and 90° C. This results in a heated, homogenized liquid or suspension containing almond flour particles.

The hot high-pressure homogenization can generally be performed at the maximum heating temperature of the preceding heating step. However, it is possible and preferred when said maximum heating temperature of the heated liquid during the heating step and the temperature of the heated liquid at the beginning of and/or during the hot high-pressure homogenization step differ from one another, in particular in such a manner that the heated liquid is cooled to a hot high-pressure homogenization temperature after the heating step, the hot high-pressure homogenization temperature preferably being between 72° C. and 100° C., the maximum heating temperature during the heating step preferably being higher than 100° C. The pressures and the method of the hot high-pressure homogenization and the devices used can be selected by analogy with the cold high-pressure homogenization step, which is explained in detail above. In particular, it is possible to use both hot high-pressure homogenization devices according to the baffle plate principle and alternative devices, such as devices conveying the liquid at high pressures of preferably at least 600 bar or higher through an interaction chamber including micro channels, as it was already explained in detail referring to the cold high-pressure homogenization.

Regardless of whether a cold high-pressure homogenization takes place before the hot high-pressure homogenization or whether it is deliberately dispensed with, it is preferred when the single-stage or multi-stage hot high-pressure homogenization step is carried out in such a manner, in particular at a pressure of at least 20 bar, preferably at a pressure from a range between 20 bar and 600 bar or higher, that the heated liquid and thus the subsequently cooled, previously heated liquid or the resulting first or second food product particulates according to claims 10 and 12 have a particle size distribution which is characterized by a mean particle diameter $x_{50,3}$ smaller than 36 μm, preferably between 5 μm and 35 μm, particularly preferably of at least approximately 15 μm. Additionally, it is particularly preferred when the particle size distribution is characterized by a $x_{10,3}$ particle diameter of <10 μm, preferably between 6 and 9 μm, more preferably between 7 and 8 μm. It is additionally or alternatively preferred when the particle size distribution is characterized by a $x_{90,3}$ particle diameter of <100 μm, in particular between 1 μm and 99 μm, preferably between 10 μm and 99 μm, in a preferred manner between 35 and 99 μm, more preferably between 36 and 80 μm, particularly preferably between 45 and 75 μm.

According to a first embodiment of the method according to the invention for obtaining a first food product particulate, the heated homogenized liquid is cooled, in particular to a temperature between 16° C. and 46° C., preferably between 16° C. and 44° C., and then fermented by adding lactic acid bacteria (culture, e.g., yoghurt cultures). It is particularly preferred when the fermented product is subjected to an additional cooling step after fermentation and is cooled, in particular, to a temperature from the temperature range between 0.1° C. and 10° C. The fermented first food product particulate can either be only hot high-pressure homogenized or, alternatively, both cold high-pressure homogenized and hot high-pressure homogenized, according to the aforementioned possible homogenization steps.

The fermented first food product particulate, regardless of whether it has been only hot or both cold and hot high-pressure homogenized, is characterized by a water content between 70 and 99% by weight, preferably between 80 and 85% by weight, and/or a fat content between 0.1 and 4.5% by weight, preferably of at least approximately 2.1% by weight, and/or a protein content between 0.5 and 15.6% by weight, preferably of at least approximately 6.5% by weight, and/or a pH between 4.1 and 5.1, preferably of at least approximately 4.5.

According to a second embodiment of the method, in place of the fermentation, the method can be realized in such a manner that a non-fermented second food product particulate is obtained by cooling the heated high-pressure homogenized liquid following the hot high-pressure homogenization, in particular to a temperature from the temperature range between 0.1° C. and 10° C., and not fermenting it. By analogy with the first food product particulate, the non-fermented second food product particulate can be hot high-pressure homogenized only or, alternatively, both hot and previously cold high-pressure homogenized.

When it is cold and hot high-pressure homogenized, the non-fermented second food product particulate is preferably characterized by a water content between 70 and 99% by weight when it is cold high-pressure homogenized and between 75 and 99% by weight without a cold high-pressure homogenization, preferably between 80 and 85% by weight (with or without a cold high-pressure homogenization), and/or a fat content between 0.1 and 4.5% by weight, particularly preferably of 2.1% by weight, and/or a protein content between 0.5 and 15.6% by weight, particularly preferably of 6.5% by weight, and/or a pH from a range between 6.2 and 6.8, preferably of at least approximately 6.5. The only hot high-pressure homogenized, non-fermented second food product particulate is preferably characterized by a water content between 75 and 99% by weight, preferably between 80 and 85% by weight, and/or a fat content between 0.1 and 4.5% by weight, preferably of at least approximately 2.1% by weight, and/or a protein content between 0.5 and 15.6% by weight, preferably of at least approximately 6.5% by weight, and/or a pH between 6.2 and 6.8, preferably of at least approximately 6.5.

To sum up, a fermented first food product particulate or a non-fermented second food product particulate can be obtained from the method according to the invention, the first and the second food product particulate being either hot high-pressure homogenized only or both cold high-pressure homogenized and hot high-pressure homogenized. The first and/or the second food product particulate can be consumed directly as a final food product or can be further processed as a recipe component within the scope of advantageous embodiments of the method.

For obtaining the first and/or second food product particulate, at least one additional ingredient, in particular from the group of ingredients such as herbs, fruits, preparations, can be added to the heated homogenized liquid, in particular after cooling. In the case of the first food product particulate, the addition takes place, preferably, after the fermentation and, particularly preferably, after the facultative additional cooling step to a temperature of less than 10° C. In the case of the non-fermented second food product particulate, the addition also takes place, preferably, after cooling, preferably to a temperature of no more than 44° C. and higher than 10° C., or after cooling to a temperature of less than 10° C.

On the basis of a food product particulate according to the invention, it is possible, and envisaged in an embodiment of the invention, to produce a preferably vegan, firm, preferably already sliced final food product as an alternative to a milk-based cheese. The non-fermented second food product particulate can be used both in the only hot high-pressure homogenized embodiment and in the cold and hot high-pressure homogenized embodiment. In order to produce the firm final food product, it is also conceivable to use the fermented first food product both in the only hot high-pressure homogenized embodiment and in the cold and hot high-pressure homogenized embodiment. The first or second food product particulate is preferably used at a percentage by weight between 1 and 60% by weight, in a preferred manner between 30 and 50% by weight, preferably of at least approximately 45% by weight, the obtained final food product being characterized by a percentage by weight of water between 45 and 60% by weight, preferably between 52 and 56% by weight, particularly preferably of at least approximately 45% by weight, and/or a proportion by weight of fat between 5 and 35% by weight, preferably between 10 and 20% by weight, and/or a percentage by weight of protein between 1 and 10% by weight, preferably between 3 and 5% by weight, and/or a pH between 4 and 7, preferably between 4.8 and 5.0. It is conceivable to use only the first or only the second food product particulate or random mixtures. If mixtures are used, the abovementioned preferred percentages by weight of the food product particulate shall apply to the mixture, i.e. the total quantity of the first and second food product particulates.

Furthermore, based on a food product particulate according to the invention, it is possible to produce a final food product as an alternative to a milk-based feta. The either both cold and hot high-pressure homogenized or only hot high-pressure homogenized fermented first food product particulate is suitable for said production. The first food product particulate is used at a percentage by weight between 1 and 60% by weight, in a preferred manner between 30 and 50% by weight, preferably of at least approximately 45% by weight, the final food product being an alternative to milk-based feta being characterized by a percentage by weight of water between 40 and 60% by weight, preferably between 52 and 57% by weight, particularly preferably of at least approximately 55% by weight, and/or a percentage by weight of fat between 5 and 35% by weight, preferably between 10 and 20% by weight, and/or a percentage by weight of protein between 1 and 10% by weight, preferably between 3 and 5% by weight, and/or a pH between 3.5 and 6, preferably between 4.4 and 4.7.

Additionally, it is possible to further process the fermented first food product particulate (only hot or, alternatively, cold and hot high-pressure homogenized) into a preferably vegan final food product as an alternative to an acidified milk-based beverage. The first food product particulate used to do so is used at a percentage by weight between 1 and 100% by weight, in a preferred manner between 1 and 99.9% by weight, preferably between 15 and 25% by weight, the final food product being characterized by a percentage by weight of water between 70 and 95% by weight, preferably between 80 and 90% by weight, and/or a percentage by weight of fat between 0.1 and 10% by weight, preferably between 1 and 5% by weight, and/or a percentage by weight of protein between 0.1 and 10% by weight, preferably between 1 and 3% by weight, and/or a pH between 3.5 and 6, preferably between 4.1 and 4.7.

The first food product particulate can be used as an alternative to milk-based curd or yoghurt (with similar texture properties), in particular when at least one additional ingredient, such as pectin, is already added during the production of the fermented first food product particulate, preferably before and/or during the obligatory heating step. Furthermore, it is conceivable, and envisaged within the scope of the invention, to offer or to consume the fermented first food product without additional ingredients as a final food product, in particular as an alternative to milk-based curd or yoghurt. In this case, the percentage by weight of the fermented first food product particulate in the final product is 100%. Regardless of whether additional ingredients are added, the alternative to a milk-based curd or yoghurt, i.e. the final food product, is characterized by a percentage by weight of water between 65 and 90% by weight, preferably between 70 and 85% by weight, and/or a fat content between 0.2 and 25% by weight, preferably between 1.5 and 10% by weight, and/or a protein content between 3 and 15% by weight, preferably between 6 and 10% by weight, and/or a pH between 3.5 and 5.5, preferably between 4.0 and 5.0.

Additionally, the invention relates to a preferably vegan food product particulate based on almonds (high-pressure homogenized suspension of almond flour particles in water), preferably as a recipe component for producing a final food product or directly as a final food product, the food product particulate being preferably produced according to a method according to the invention. All disclosed features disclosed in connection with the explanation of the method, in particular the features of the food product particulate and of the final food product, are seen as disclosed for the characterization of the final food product according to the invention independent of the described method and are thus also claimable therefor.

The food product particulate according to the invention is characterized by a percentage by weight of almond protein, preferably resulting exclusively from the use of partially de-oiled almond flour, between 0.5 and 21% by weight, preferably between 4 and 10% by weight, particularly preferably of at least approximately 6.5% by weight, and a percentage by weight of fat, preferably resulting exclusively from the use of partially de-oiled almond flour, between 0.1 and 5% by weight, preferably between 1 and 3% by weight, particularly preferably approximately 2.1% by weight, the food product particulate according to the invention having a particle size distribution which is characterized by a mean particle diameter $x_{50,3}$ of less than 36 μm, preferably between 5 μm and 35 μm, particularly preferably of 15 μm.

Furthermore, the invention relates to a food product, in particular a vegan food product being an alternative to milk curd or yoghurt, a firm food product being an alternative to milk-based cheese, a food product being an alternative to milk-based feta and/or a food product being an alternative to milk-based yoghurt, the food product according to the invention being characterized by a percentage by weight of more than 1% by weight of a preferably vegan food product particulate according to the invention. In this case, too, the features of the final food products disclosed in detail in connection with the explanation of the method are seen as disclosed independent of the method in terms of their composition and are thus also claimable therefor.

BRIEF DESCRIPTION OF THE DRAWINGS

Further advantages, features and details of the invention can be derived from the following description of a preferred exemplary embodiment and from FIG. 1, which shows embodiments of the method according to the invention.

DETAILED DESCRIPTION

FIG. 1 shows possible embodiments of the method according to the invention for producing either a fermented first food product particulate or a non-fermented second food product particulate, the first and the second food product particulate being either hot high-pressure homogenized only or both cold and hot high-pressure homogenized.

In A, almonds are blanched, almond oil C being removed in B (oil mill). In D, this results in an almond press-cake, which is ground in E. In F, this results in almond flour having the features described in the general description section as a basis for producing a food product particulate according to the invention. The aforementioned pre-stages for producing the almond flour can be added to the method according to the invention.

In G, water and, optionally, at least one additional ingredient, preferably no additional ingredient, are added and mixed with the almond flour in H. I is a facultative cold high-pressure homogenization step (>20 bar) for cold homogenization of the liquid mixture obtained from the mixing in H.

In J, either after completed cold high-pressure homogenization or dispensing with said homogenization, the liquid mixture is heated, namely to a temperature between 72° C. and 138° C. in the case at hand, causing the contained proteins to denature and large rough almond particle agglomerates to form.

Step K following heating step J is facultative. Said step is a heat-holding step. Following step K or directly following step J, a hot high-pressure homogenization step is performed in step L, which is then followed by a cooling step M. Within the scope of said cooling step, the still heated (>60° C., preferably 72° C.) hot high-pressure homogenized liquid mixture is cooled to a temperature from a range between 16° C. and 44° C., preferably to 43° C.

In the left strand of the drawing layer, a lactic acid culture, such as a yoghurt culture, is added in N, and a fermentation is realized in O, in particular between 2 and 16 hours, followed by an additional cooling step to a temperature of less than 10° C. in P, after which at least one additional ingredient R can optionally be added. As a possible result of the method, this leads to a fermented first food product particulate which can be hot high-pressure homogenized only or both cold and hot high-pressure homogenized.

In the right strand, cooling is continued in Q to a temperature of less than 10° C., wherein steps M and Q can of course be combined in the right strand. At the indicated positions of the right strand, at least one additional ingredient can be added in R. As a possible result of the method, this this leads to a non-fermented second food product particulate which is either hot high-pressure homogenized only or both cold and hot high-pressure homogenized.

As preferred and explained in detail within the scope of the general description section, the obtained food product particulates X, Y can be further processed into final food products, in particular into vegan final food products.

REFERENCE SIGNS

X first food product particulate
Y second food product particulate

The invention claimed is:
1. A method for producing a food product particulate based on almond flour, as a recipe component for producing final food products or directly as a final food product, comprising the steps:
   a) providing partially de-oiled almond flour having a proportion by weight of fat between 5 and 20% by weight, and a proportion by weight of protein between 43 and 57% by weight,
   b) providing water,
   c) producing a liquid mixture of the partially de-oiled almond flour and the water, the percentage by weight of the almond flour in the mixture being selected to be between 1 and 40% by weight, and the percentage by weight of water being selected to be between 60 and 99% by weight,
   d) heating the liquid mixture to a temperature from a temperature range between 72° C. and 138° C. and obtaining a heated liquid, an agglomeration of almond particles of the almond flour taking place during the heating step to produce agglomerates in the heated liquid,
   e) high-pressure homogenizing the heated liquid containing the agglomerates, in a single-stage or multi-stage hot high-pressure homogenization step, after a heat holding time between 30 s and 25 min at a temperature between 50° C. and 138° C., to obtain a heated hot high-pressure homogenized liquid,
   f) cooling the heated hot high-pressure homogenized liquid.

2. The method according to claim 1, wherein the food product particulate is a vegan food product.

3. The method of claim 1, wherein step e) comprises a single-stage hot high-pressure homogenization step.

4. The method according to claim 1, wherein before the heating step d), the liquid mixture is high-pressure homogenized, at a temperature under 72° C., in a single-stage or multi-stage cold high-pressure homogenization step, and a cold high-pressure homogenized liquid mixture is obtained.

5. The method according to claim 4, wherein the liquid mixture is high-pressure homogenized without a preceding heating step.

6. The method according to claim 5, wherein the cold high-pressure homogenization step is carried out in such a manner, that the cold high-pressure homogenized liquid mixture has a particle size distribution which is characterized by at least one of a mean particle diameter $x_{50,3} < 36$ μm, and by a particle diameter $x_{10,3} < 10$ μm, and a particle diameter $x_{90,3} < 100$ μm.

7. The method of claim 6, wherein the cold high-pressure homogenization step is carried out at a pressure from a range between 20 and 600 bar.

8. The method according to claim 1, wherein a combination of a heating temperature and a heat-holding time is selected in such a manner that, at the time of the beginning of the hot high-pressure homogenization, a denaturation enthalpy of the heated liquid (almond particle dispersion) is <3 joule/g protein.

9. The method according to claim 1, wherein the hot high-pressure homogenization step is performed in such a manner that the heated high-pressure homogenized liquid has a particle size distribution which is characterized by at least one of a mean particle diameter $x_{50,3}$<36 µm, a particle diameter $x_{10,3}$<10 µm, and a particle diameter $x_{90,3}$<100 µm.

10. The method of claim 9, wherein the hot high-pressure homogenization step is carried out at a pressure from a range between 20 and 600 bar.

11. The method according to claim 9, wherein the cooling step comprises cooling the heated hot high-pressure homogenized liquid to a temperature between 0.1° C. and 10° C., and not fermenting, whereby a non-fermented second food product particulate is obtained.

12. The method according to claim 11, wherein the either cold and hot high-pressure homogenized or only hot high-pressure homogenized, second food product particulate is used as a recipe component at a percentage by weight between 1 and 60% by weight, for e production of a sliced final food product which is an alternative to milk-based cheese and which is characterized by at least one of a percentage by weight of water between 45 and 60% by weight, a percentage by weight of fat between 5 and 35% by weight, a percentage by weight of protein between 1 and 10% by weight, and a pH between 4 and 7.

13. The method according to claim 1, wherein at least one additional ingredient selected from the group of ingredients consisting of herbs, fruits and preparations is added, before and/or during the heating step d), in order to obtain the food product particulate.

14. The method according to claim 1, wherein the cooling step comprises cooling the heated hot high-pressure homogenized liquid to a temperature between 16° C. and 46° C., and then fermenting with lactic acid bacteria and, after an additional cooling step to a temperature between 0.1° C. and 10° C., the food product particulate is obtained in the form of a fermented first food product particulate.

15. The method according to claim 14, wherein the either cold and hot high-pressure homogenized or only hot high-pressure homogenized, first food product particulate is used as a recipe component at a percentage by weight between 1 and 60% by weight, for production of a sliced final food product which is an alternative to milk-based cheese and which is characterized by at least one of a percentage by weight of water between 45 and 60% by weight, a percentage by weight of fat between 5 and 35% by weight, a percentage by weight of protein between 1 and 10% by weight, and a pH between 4 and 7.

16. The method according to claim 14, wherein the either cold and hot high-pressure homogenized or only hot high-pressure homogenized fermented first food product particulate is used as a recipe component at a percentage by weight between 1 and 60% by weight, for production of a final food product which is an alternative to milk-based feta and which is characterized by at least one of a percentage by weight of water between 40 and 60% by weight, a percentage by weight of fat between 5 and 35% by weight, a percentage by weight of protein between 1 and 10% by weight, and a pH between 3.5 and 6.

17. The method according to claim 14, wherein the either cold and hot high-pressure homogenized or only hot high-pressure homogenized fermented first food product particulate is used as a recipe component at a percentage by weight between 1 and 100% by weight, for production of an acidified, final food product which is an alternative to milk-based beverages and which is characterized by at least one of a percentage by weight of water between 70 and 95% by weight, a percentage by weight of fat between 0.1 and 10% by weight, a percentage by weight of protein between 0.1 and 10% by weight, and a pH between 3.5 and 6.

* * * * *